United States Patent
Kislitsin

(10) Patent No.: US 11,503,044 B2
(45) Date of Patent: Nov. 15, 2022

(54) METHOD COMPUTING DEVICE FOR DETECTING MALICIOUS DOMAIN NAMES IN NETWORK TRAFFIC

(71) Applicant: Group IB TDS, Ltd, Moscow (RU)

(72) Inventor: Nikita Igorevich Kislitsin, Moscow (RU)

(73) Assignee: GROUP IB TDS, LTD, Moscow (RU)

( * ) Notice: Subject to any disclaimer, the term of this patent is extended or adjusted under 35 U.S.C. 154(b) by 619 days.

(21) Appl. No.: 16/247,870

(22) Filed: Jan. 15, 2019

(65) Prior Publication Data
US 2019/0222589 A1     Jul. 18, 2019

(30) Foreign Application Priority Data
Jan. 17, 2018 (RU) .......................... RU2018101759

(51) Int. Cl.
| | |
|---|---|
| *H04L 29/06* | (2006.01) |
| *H04L 29/12* | (2006.01) |
| *H04L 9/40* | (2022.01) |
| *H04L 61/3015* | (2022.01) |
| *H04L 61/4511* | (2022.01) |

(52) U.S. Cl.
CPC ...... *H04L 63/1416* (2013.01); *H04L 63/0236* (2013.01); *H04L 61/1511* (2013.01); *H04L 61/3025* (2013.01)

(58) Field of Classification Search
None
See application file for complete search history.

(56) References Cited

U.S. PATENT DOCUMENTS

| | | |
|---|---|---|
| 7,225,343 B1 | 5/2007 | Honig et al. |
| 7,496,628 B2 | 2/2009 | Arnold et al. |

(Continued)

FOREIGN PATENT DOCUMENTS

| | | |
|---|---|---|
| CN | 103491205 A | 1/2014 |
| CN | 104504307 A | 4/2015 |

(Continued)

OTHER PUBLICATIONS

Notice of Allowance with regard to the counterpart U.S. Appl. No. 15/858,013 dated Jun. 10, 2020.

(Continued)

*Primary Examiner* — Mohamed Ibrahim
(74) *Attorney, Agent, or Firm* — BCF LLP

(57) ABSTRACT

There are disclosed a method and computing device for detecting malicious domain names in network traffic. The method comprises: receiving the network traffic from a data network, extracting a plurality of data packets from the network traffic, analyzing the plurality of data packets in order to extract at least one domain name from the plurality of data packets; generating, for a given one of the at least one domain names, a given numerical value representative of a suspiciousness of the given one of the at least one domain name, the given numeric value being based on a given set of features of domain name suspiciousness corresponding to one of the given set of analysis methods; classifying the at least one domain name as malicious domain names, in response to an analysis being indicative the given domain name being a malicious domain name.

19 Claims, 2 Drawing Sheets

(56) References Cited

U.S. PATENT DOCUMENTS

| | | | |
|---|---|---|---|
| 7,712,136 B2 | 5/2010 | Sprosts et al. |
| 7,730,040 B2 | 6/2010 | Reasor et al. |
| 7,854,001 B1 | 12/2010 | Chen et al. |
| 7,865,953 B1 | 1/2011 | Hsieh et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,219,549 B2 | 7/2012 | Gao et al. |
| 8,255,532 B2 | 8/2012 | Smith-Mickelson et al. |
| 8,260,914 B1 | 9/2012 | Ranjan |
| 8,266,695 B1 | 9/2012 | Clay |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,578,480 B2 | 11/2013 | Judge et al. |
| 8,600,993 B1 | 12/2013 | Gupta et al. |
| 8,612,463 B2 | 12/2013 | Brdiczka et al. |
| 8,612,560 B2 | 12/2013 | Oliver et al. |
| 8,625,033 B1 | 1/2014 | Marwood et al. |
| 8,631,489 B2* | 1/2014 | Antonakakis ....... H04L 63/1408 726/22 |
| 8,635,696 B1 | 1/2014 | Aziz |
| 8,650,080 B2 | 2/2014 | O'Connell et al. |
| 8,660,296 B1 | 2/2014 | Ioffe |
| 8,677,472 B1 | 3/2014 | Dotan et al. |
| 8,762,537 B2 | 6/2014 | Alperovitch et al. |
| 8,776,229 B1 | 7/2014 | Aziz |
| 8,850,571 B2 | 9/2014 | Staniford et al. |
| 8,856,239 B1 | 10/2014 | Oliver et al. |
| 8,856,937 B1 | 10/2014 | Wüest et al. |
| 8,898,787 B2 | 11/2014 | Thompson et al. |
| 8,972,412 B1 | 3/2015 | Christian et al. |
| 8,984,640 B1 | 3/2015 | Emigh et al. |
| 9,026,840 B1 | 5/2015 | Kim |
| 9,060,018 B1 | 6/2015 | Yu et al. |
| 9,100,335 B2 | 8/2015 | Oliver et al. |
| 9,210,111 B2 | 12/2015 | Chasin et al. |
| 9,215,239 B1 | 12/2015 | Wang et al. |
| 9,253,208 B1 | 2/2016 | Koshelev |
| 9,300,686 B2 | 3/2016 | Pidathala et al. |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,584,541 B1 | 2/2017 | Weinstein et al. |
| 9,654,593 B2 | 5/2017 | Garg et al. |
| 9,723,344 B1 | 8/2017 | Granström et al. |
| 9,736,178 B1 | 8/2017 | Ashley |
| 9,749,336 B1* | 8/2017 | Zhang ................ H04L 63/0236 |
| 9,847,973 B1 | 12/2017 | Jakobsson et al. |
| 9,888,019 B1 | 2/2018 | Pidathala et al. |
| 9,917,852 B1 | 3/2018 | Xu et al. |
| 9,934,376 B1 | 4/2018 | Ismael |
| 10,044,748 B2 | 8/2018 | Dagon et al. |
| 10,129,194 B1 | 11/2018 | Jakobsson |
| 10,270,744 B2 | 4/2019 | Yu et al. |
| 10,587,646 B2 | 3/2020 | Fakeri-Tabrizi et al. |
| 10,715,543 B2 | 7/2020 | Jakobsson |
| 2002/0161862 A1 | 10/2002 | Horvitz |
| 2003/0009696 A1 | 1/2003 | Bunker et al. |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0095377 A1* | 4/2010 | Krywaniuk ............. H04L 51/12 726/22 |
| 2010/0115620 A1 | 5/2010 | Alme |
| 2010/0115621 A1 | 5/2010 | Staniford et al. |
| 2010/0191737 A1 | 7/2010 | Friedman et al. |
| 2010/0205665 A1 | 8/2010 | Komili et al. |
| 2010/0235918 A1 | 9/2010 | Mizrahi et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0209987 A1 | 8/2012 | Rhinelander et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0263264 A1 | 10/2013 | Klein et al. |
| 2013/0297619 A1 | 11/2013 | Chandrasekaran et al. |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0181975 A1 | 6/2014 | Spernow et al. |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0200963 A1 | 7/2015 | Geng et al. |
| 2015/0220735 A1 | 8/2015 | Paithane et al. |
| 2015/0295945 A1 | 10/2015 | Canzanese et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0112445 A1 | 4/2016 | Abramowitz |
| 2016/0127907 A1 | 5/2016 | Baxley et al. |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0352772 A1* | 12/2016 | O'Connor .......... H04L 63/1483 |
| 2016/0359679 A1 | 12/2016 | Parandehgheibi et al. |
| 2017/0034211 A1 | 2/2017 | Buergi et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1* | 10/2017 | Havelka ............. H04L 63/1441 |
| 2017/0324738 A1 | 11/2017 | Hari et al. |
| 2017/0346839 A1 | 11/2017 | Peppe et al. |
| 2018/0007070 A1* | 1/2018 | Kulkarni ............. H04L 63/1425 |
| 2018/0012021 A1 | 1/2018 | Volkov |

(56) References Cited

U.S. PATENT DOCUMENTS

| | | |
|---|---|---|
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0227324 A1 | 8/2018 | Chambers et al. |
| 2018/0268464 A1 | 9/2018 | Li |
| 2018/0307832 A1 | 10/2018 | Ijiro et al. |
| 2018/0309787 A1 | 10/2018 | Evron et al. |
| 2019/0089737 A1 | 3/2019 | Shayevitz et al. |
| 2019/0207973 A1 | 7/2019 | Peng |
| 2019/0373005 A1 | 12/2019 | Bassett |
| 2020/0106809 A1 | 4/2020 | Raj |
| 2020/0134702 A1 | 4/2020 | Li |

FOREIGN PATENT DOCUMENTS

| | | |
|---|---|---|
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2668710 C1 | 10/2018 |
| RU | 2670906 C9 | 12/2018 |
| RU | 2681699 C1 | 3/2019 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |

OTHER PUBLICATIONS

English Translation of CN106713312, ©Questel—FAMPAT, Jul. 17, 2019.
English Translation of CN105897714, ©Questel—FAMPAT, Jul. 17, 2019.
English Translation of CN106506435, ©Questel—FAMPAT, Jul. 26, 2019.
English Translation of CN107392456, ©Questel—FAMPAT, Jul. 29, 2019.
English Translation of CN103491205, ©Questel—FAMPAT, Jul. 29, 2019.
English Translation of CN106131016, ©Questel—FAMPAT, Jul. 17, 2019.
Invitation to Respond to Written Opinion with regard to the counterpart SG Patent Application No. 10201900339Q.
Invitation to Respond to Written Opinion with regard to the counterpart SG Patent Application No.10201901079U.
Invitation to Respond to Written Opinion rwith regard to the counterpart SG Patent Application No. 10201900335P.
Notice of Allowance with regard to the counterpart U.S. Appl. No. 15/858,013 dated May 8, 2020.
Office Action with regard to the counterpart U.S. Appl. No. 15/707,641 dated Apr. 25, 2019.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN 105429956 retrieved on Espacenet on Jan. 7, 2020.
English Abstract for CN 104504307 retrieved on Espacenet on Jan. 7, 2020.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 (Year: 2005)—cited in the Notice of Allowance with regard to the counterpart U.S. Appl. No. 15/707,641.
Office Action with regard to the counterpart U.S. Appl. No. 16/659,697 dated May 12, 2021.
Notice of Allowance with regard to the counterpart U.S. Appl. No. 15/858,032 dated Jul. 30, 2020.
Office Action with regard to the counterpart U.S. Appl. No. 16/270,341 dated May 27, 2020.
Office Action with regard to the counterpart U.S. Appl. No. 16/261,854 dated Oct. 21, 2019.
English Abstract of RU 107616 retrieved on Espacenet on Jul. 3, 2017.
European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 dated Jun. 1, 2017.
Search Report with regard to the counterpart RU Patent Application No. 2018101760 completed Jun. 22, 2018.
European Search Report with regard to the counterpart EP Patent Application No. EP17210904 completed May 16, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.

(56) References Cited

OTHER PUBLICATIONS

English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
Search Report with regard to the counterpart RU Patent Application No. 2018101759 completed Sep. 7, 2018.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Office Action received with regard to the counterpart U.S. Appl. No. 15/858,032 dated Apr. 6, 2020.
Office Action with regard to the counterpart U.S. Appl. No. 15/858,013 dated Nov. 22, 2019.
Office Action with regard to the counterpart U.S. Appl. No. 16/659,687 dated Mar. 16, 2022.

* cited by examiner

METHOD COMPUTING DEVICE FOR DETECTING MALICIOUS DOMAIN NAMES IN NETWORK TRAFFIC

CROSS-REFERENCE

The present application claims convention priority to Russian Utility Patent Application No. 2018101759, filed on Jan. 17, 2018, entitled "METHOD COMPUTING DEVICE FOR DETECTING MALICIOUS DOMAIN NAMES IN NETWORK TRAFFIC", the entirety of which is incorporated herein by reference.

TECHNICAL FIELD

The non-limiting embodiments of the present technology relate to the field of information security in computer systems and data networks, and in particular to a computing device and a method for detecting malicious domain names in network traffic.

BACKGROUND

Nowadays, due to the continuous scientific and technological progress in the field of information technology, information security is becoming increasingly important, in particular, protection against various malicious programs that allow attackers to remotely control infected computers (each computer individually, a portion of computers coupled to a particular communication network and/or the entire communication network).

A computer network consisting of a number of computers running autonomous malicious software (bots) running on them is called a botnet. Bots, as such, as part of a botnet, are not viruses, but are essentially a set of software that is secretly installed on a victim's computer and allows an attacker to perform some kind of malicious activity using the resources of an infected computer; firewalls, programs for remotely controlling a computer, as well as tools to hide from the operating system. One of the possible sources of infection can be the Internet, local area network, flash drives, etc.

Botnets have powerful computing resources, are a common cyber attack tool and a good way to make money for intruders. At the same time, the owner of a botnet can control the infected computers from as long as the owner has access to the network: from another city, country or even from another continent, and the organization of the Internet allows the owner to execute such control anonymously. In particular, botnets can be used by intruders to accomplish the following tasks and/or implement the following malicious actions:

1. Spamming.

Spamming is the most common and one of the easiest botnet exploitation options. According to expert estimates, more than 80% of spam is now sent from infected computers. Spam from botnets is not necessarily sent by network owners. For a fee, "spammers" can rent a botnet. Thousands of botnets allow spammers to send millions of mailings from infected machines in a short period of time. Addresses from which spam is actively sent are often blacklisted by mail servers, and emails coming from them are blocked or automatically marked as spam, but the ability to send spam from a huge number of infected computers prevents a sender from using the same addresses for sending. In addition, botnets also allow a sender to collect email addresses on infected computers, which can be sold to spammers or used when sending spam by the botnet owners themselves.

2. Cyber Blackmail.

Botnets are also widely used for Distributed Denial of Service (DDoS) attacks. In the course of such distributed attacks from computers infected by a bot, a stream of false requests to the attacked server on the network is created. As a result, the server becomes unavailable to users due to overload. As a rule, attackers demand a "ransom" for stopping the attack. In today's world, many companies work only through the Internet, so for them the inaccessibility of servers means a complete stop of business, which can lead to significant financial losses.

3. Anonymous Access to the Network.

Attackers can access servers on the network using infected computers and on behalf of infected machines can commit cybercrime, for example, can hack websites or transfer stolen money.

4. Sale and Rental of Botnets.

One of the options for illegal earnings with the help of botnets is to rent or sell a botnet. Creating botnets for sale is a separate area of cybercrime business.

5. Phishing.

The addresses of phishing pages can be quite quickly blacklisted, but the botnet allows phishers to quickly change the address of the phishing page using infected computers as proxies, which allows them to hide the real address of the phisher's web server.

6. Theft of Confidential Data.

Botnets can also be used to steal various passwords (for example, access to e-mail, Skype, social networks, FTP resources, web services such as remote banking, etc.) and other confidential user data. A bot in a botnet with which computers are infected can download another malicious program, for example, a Trojan that steals passwords. In this case, all the computers included in this botnet will be infected with a Trojan program, and attackers will be able to get passwords from all infected computers. Stolen passwords can be resold or used, in particular, for mass infection of web pages (for example, passwords for all uncovered FTP accounts) for further distribution of malicious bot software and botnet expansion.

Managing a computer that is infected with a bot can be direct and indirect. In the case of direct control, an attacker can establish communication with the infected computer and control it using the commands built into the body of the bot program. In the case of indirect control, the bots themselves establish contact with special command and control (C&C) servers or other computers on the network, send a request and execute the received command. One of the main commands received by bots from C&C servers are the following control commands:

1. "Update" Type Command

The essence of this command is to download and run a given executable file or module from a given server. This command is basic, since it is executed before any other commands are executed. It allows the owner to update the bot's executable file in the case the owner wants to install an upgraded version of the bot. The same command allows the owner to infect the infected computer with other malware (viruses, worms), as well as install other bots on the infected computer. Using this command, Trojans can be simultaneously installed on all infected computers, the Trojan for searching all passwords ever entered on the infected computer(s) and stored in its memory and send them to a server accessible by the Internet (the server associated with the bot owner, as an example).

2. "Flood" Type Command.

The essence of this command is to begin the process of creating a stream of false requests to a given server on the network to disable this server or to overload the Internet channel of a given global network segment. Creating such a stream can cause serious server problems leading to its inaccessibility for legitimate users.

3. "Spam" Type Command.

The essence of this command is to load a spam message template and start sending spam to specified addresses (there is a separate portion of addresses for each bot).

4. "Proxy" Type Command.

The essence of this command is to use a computer from a botnet as a proxy server to hide the real address of the attacker who controls the botnet. This functionality is often not separated into a separate command, but immediately included in the general functionality of the bot.

5. Other Commands.

There are other less popular commands that are implemented in individual bots. For example, these additional commands allow to receive copies of the image from the user's screen, monitor the input of passwords from the keyboard, request a file with the user's network communication protocol (used to steal accounts and confidential data), send the specified file from the user's computer, request serial numbers, receive detailed information about the user's system and its environment, request a list of computers included in the botnet, etc.

To keep control and management of infected computers, botnets use a variety of methods, such as peer-to-peer networks, mail protocols, social networks or anonymous networks, such as TOR and i2p, but currently the most common domain generation (DGA) algorithms used to generate a large number of pseudo-random domain names, allowing them to establish a connection with a C&C computing device, and allowing to protect the C&C server from a single disconnection or adding its address blacklisted.

Infected computers that are part, for example, of a corporate network can be detected using antivirus programs installed on such computers. In addition, the task of detecting infected computers on a network can be solved centrally by analyzing network traffic, which provides proactive protection and increases the transparency of the distribution of malicious code in a specified network.

One of the approaches to analyzing traffic is based on a predefined set of rules characterizing the activity of malicious software. This approach works well for detecting known malware, but it is almost useless against new threats. In this case, the situation can be addressed and improved by adding learning algorithms.

When an infected computer establishes a communication channel with a C&C computing device, malware settings can be intercepted, which may include a list of C&C servers with which communication is planned, which allows for tracking the intruder and identifying other infected computers.

When using the DGA algorithm in malware, bots select one of the active domains based on certain parameters (which can be variable over time), and in this case, the malware can select a new domain used for communication for each instance of the communication. In this case, a static domain block will not neutralize the malware. To detect an infected computer that is infected with DGA algorithm based malware, it is known in the prior art to use a machine learning (ML) approach to look for anomalies in application data transfer protocols, in which the following rules are used to detect the DGA algorithm based malware:

domain names include unnatural combinations of letters that are not found in natural language (for example, numbers in the middle of a word);

most domains do not actually exist;

search of a large number of domains is carried out in a very short period of time.

It should be noted that the goal of any machine learning algorithm used to solve the above problem is to train the classifier to distinguish malicious activity that meets the above criteria.

One of the illustrative examples of detection of infected computers on the network is described in U.S. Pat. No. 8,402,543 (publ. on Mar. 19, 2013). In particular, U.S. Pat. No. 8,402,543 discloses a system and method for detecting bots in network traffic by using a classification model trained during the training phase using machine learning algorithms on features extracted from network data packets associated with a known malicious client or a known non-malicious client, and applying a trained classification model to features extracted in real-time from current network data, indicates the presence of an active communication channel between the malicious client and the controlling computing device: the number of data streams transmitted over a specified period of time, the number of data packets transmitted over a specified period of time, and the number of bits transmitted over a specified period of time.

Another illustrative example of detecting infected computers on a network is described in U.S. Pat. No. 8,555,388 (publ. on Oct. 8, 2013). In particular, it is disclosed in U.S. Pat. No. 8,555,388 the system and method for heuristic detection of botnet network by tracking all network traffic to identify it malicious network traffic and by detecting the bot using heuristic analysis of the behavior of malicious network traffic using the processor, which includes command and control traffic associated with the control bot, while the monitored network traffic is assigned an estimate corresponding to the probability of attributing this monitored network traffic to the botnet network, the assigned score is increased if additional indicators of suspicious behavior associated with the monitored network traffic are met, and it is determined whether the suspicious behavior is associated with the botnet network based on the received score.

It should be noted that the detection mechanisms of infected devices in the data network, described in U.S. Pat. Nos. 8,402,543 or 8,555,388 patents, require significant computational resources and provide an insufficient probability of detecting infected devices, resulting in the implementation of a protection system at the level of end workstations or servers based on these detection mechanisms are often either impossible or inefficient.

SUMMARY

Non-limiting embodiments of the present technology have been developed based on developers appreciation that there is a need for further improvement of systems and methods of protection against malicious actions, for the organization of which the attackers use infected devices included in the botnet, in particular for the effective distribution of computing resources spent on providing such automated protection and increasing the probability of detecting such infected devices in the data network.

Consequently, the above technical problem is at least partially addressed by the non-limiting embodiments of the present technology that include creating a system and a method for detecting infected devices in the data network, which at least partially alleviate the above-mentioned drawbacks of prior art systems and detection methods. These drawbacks include, as an example, some or all of: an inefficient use of computing resources and a low probability of detecting malicious devices in the data network as part of providing automated protection.

In accordance with a first broad aspect of the present technology, there is provided a computing device for detecting malicious domain names in network traffic, the computing device comprises: a communication module configured to receive the network traffic from a data network, a filtering module, configured to connect to the communication module to receive the network traffic it and to perform: extracting a plurality of data packets from the network traffic, analyzing the plurality of data packets in order to extract at least one domain name from the plurality of data packets, an analyzing module, configured to connect to the filtering module to receive the at least one domain name from analyze each of the at least one domain name using a given set of analysis methods in order to generate, for a given one of the at least one domain names, a given numerical value representative of a suspiciousness of the given one of the at least one domain name, the given numeric value being based on a given set of features of domain name suspiciousness corresponding to one of the given set of analysis methods; a processing module, configured to connect to the analyzing module to receive given set of features of suspiciousness and the given numerical value for the at least one domain name, the processing module being further configured to: classify the at least one domain name as malicious domain names, in response to an analysis of the given set of features of suspiciousness and the given numerical value being indicative of the given set of features of suspiciousness and the numeric value being indicative of malicious domain names.

In some non-limiting embodiments of the computing device, the communication module is further configured to connect to at least one of the network traffic capture devices connected to the data network.

In some non-limiting embodiments of the computing device, the filtering module is further configured to determine if there is an analytical report for each of the at least one domain name.

In some non-limiting embodiments of the computing device, in response to a presence of the analytical report, the filtering module is further configured to execute: receiving the analytical report, determine a match of each of the at least one domain name to one of the analytical report using a character-by-character comparison of each of the each of the at least one domain name with domain names that identify the analytical report.

In some non-limiting embodiments of the computing device, in response to an absence of the analytical report for the a given one of the at least one domain name, the filtering module is further configured to transfer the given one of the least one domain name to the analyzing module.

In some non-limiting embodiments of the computing device, when analyzing the at least one domain names, the analyzing module is configured to execute: determining a number of characters in each of the at least one domain names, comparing a certain number of characters of each of the at least one domain name to a given threshold value of a length of the domain name, generating the given numerical value to a suspiciousness attribute of each of the at least one domain name, based on the comparison of the length of each of the at least one domain name band the given threshold value.

In some non-limiting embodiments of the computing device, when analyzing the at least one domain name, the analyzing module is further configured to perform: receiving a set of known domain names, determining a match between a given one of the at least one domain name with one of known domain names using a character-by-character comparison, updating the given numerical value based on another feature of the domain name suspiciousness, the another feature representing popularity of the given one of the least east one domain name based on the determined match.

In some non-limiting embodiments of the computing device, when analyzing the at least one domain name, the analyzing module is further configured to perform at least one of: determining a frequency of occurrence of each of a plurality of N-grams in each of the at least one domain name, each N-gram corresponding to a combination of N consecutive characters, determining an entropy of the N-gram of a given one of the at least one domain name as a function of a specific frequency of occurrence of each N-gram in the given one of the at least one domain name, comparing the entropy of the N-gram of the given one of the at least one domain name with a pre-determined threshold value of entropy of the N-gram, updating the given numerical value based on another feature of the domain name suspiciousness, the another feature representing entropy of the given one of the at least one domain name, depending on an outcome of the comparing.

In some non-limiting embodiments of the computing device, when analyzing the at least one domain name, the analyzing module is further configured to perform: receiving data from a language dictionary, extracting at least one word from each of the at least one domain name, matching each of the word with one of the words in the language dictionary, updating the given numerical value based on another feature of the domain name suspiciousness, the another feature representing meaningfulness of the given one of the least east one domain name, the updating being based on matching.

In some non-limiting embodiments of the computing device, when analyzing the at least one domain names, the analyzing module is further configured to perform: determining the Levenshtein distance between each of the at least one word and the corresponding one of the words in the language dictionary, comparing a given Levenshtein distance with a predetermined threshold value; updating the given numerical value based on another feature of the domain name suspiciousness, the another feature representing correctness of spelling of the analyzed domain name, the correctness being determined based on the comparing.

In some non-limiting embodiments of the computing device, the analyzing module is further configured to update the given set of analysis methods.

In some non-limiting embodiments of the computing device, in response to determining a given domain name as a malicious domain name, the processing module is further configured to execute at least one of: generating a warning message, blocking network traffic from infected devices, generating an analytical report for the malicious domain name.

In some non-limiting embodiments of the computing device, the processing module is configured execute at least one previously trained machine-learning algorithm for executing analyzing of the at least one domain name.

In some non-limiting embodiments of the computing device, the analyzing module is further configured to receive, via the communication module, at least one domain name from at least one source of domain names.

In accordance with another broad aspect of the present technology, there is provided a computing device for analyzing domain names. The computing device comprises: a communication module, configured to receive at least one domain name from at least one source of domain names, an analyzing module, configured to connect to the communication module to receive the at least one domain name to analyze each of the at least one domain name using a given set of analysis methods in order to generate a given numerical value to each of a given set of features of a domain name suspiciousness corresponding to one of a given set of analysis methods, for each of the at least one domain name, the given numeric value being based on e results of the analysis using a given one of the set of analysis methods, a processing module, configured to connect to the analyzing module to receive the features of suspiciousness with assigned numerical values for each of the at least one domain name, the processing module being further configured to execute analyzing thee features of suspiciousness with assigned numerical values for each of the at least one domain name using the set of analysis methods such that each domain name is classified as malicious domain names, in response to received results of the analysis of features of suspiciousness being characteristic of malicious domain names.

In accordance with yet another broad aspect of the present technology, there is provided a method for detecting malicious domain names in network traffic implemented by a computing device. The method comprises: receiving the network traffic from a data network, extracting a plurality of data packets from the network traffic, analyzing the plurality of data packets in order to extract at least one domain name from the plurality of data packets, generating, for a given one of the at least one domain names, a given numerical value representative of a suspiciousness of the given one of the at least one domain name, the given numeric value being based on a given set of features of domain name suspiciousness corresponding to one of the given set of analysis methods; classifying the at least one domain name as malicious domain names, in response to an analysis of the given set of features of suspiciousness and the given numerical value being indicative of the given set of features of suspiciousness and the numeric value being indicative of malicious domain names.

In some non-limiting embodiments of the method, the receiving network traffic further comprises connecting, using a communication module, to at least one of the network traffic capture devices that are part of the data network.

In some non-limiting embodiments of the method, for the at least one domain name, the method further comprises determining whether there is an analytical report for each of the at least one domain name.

In some non-limiting embodiments of the method, the classifying is executed using a machine learning algorithm.

In some non-limiting embodiments of the method, the generating the given numeric score comprises iteratively updating the given numeric score based on an outcome of at least some of the given set of analysis methods.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION OF THE NON-LIMITING EMBODIMENTS

Figure 1:
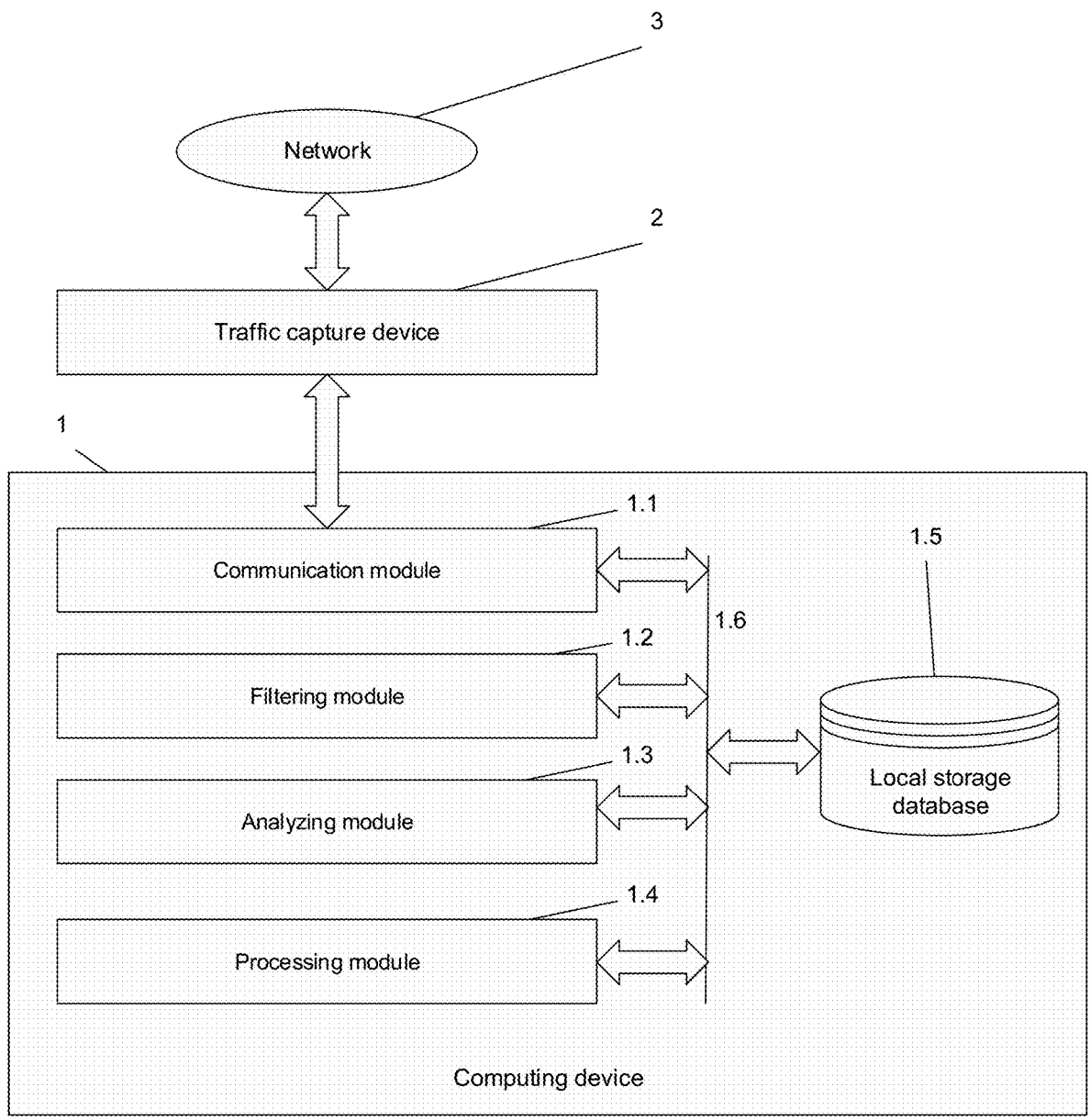
FIG. 1 depicts a system for detecting malicious domain names in network traffic, the system being implementable in accordance with non-limiting embodiments of the present technology.

FIG. 1 depicts a system 10 implemented in accordance with the non-limiting embodiments of the present technology. System 10 can be used to detect malicious domain names in a network traffic, which allows detecting suspicious domain names in the network traffic, which are used to establish a communication channel of an infected workstation or an infected computer running malicious software (bot) running on it with a managing computing device to receive control commands from therefrom. Broadly speaking, the system 10 can be used to manage ensure information security in computer systems and data networks.

System

The system 10 for detecting malicious domain names in a network traffic, as depicted in FIG. 1, comprises a computing device 1 in a form of, for example, a server. The system 10 further comprises a traffic capture device 2 connected to a data transfer network 3. The traffic capture device 2 is configured to extract network traffic from the data transfer network 3. The computing device 1 is also coupled to traffic capturing devices 2 for receiving network traffic from traffic capturing devices 2, the traffic having been extracted from data transfer network 3. The computing device 1 is configured to further process the received network traffic to determine malicious domain names used to establish connection between an infected work station or an infected computer with a control command center and then receive control commands therefrom to execute a set of programmed malware malicious actions, such as sending spam, phishing, anonymous access to the network, stealing confidential data, etc. As has been described above, the list of malicious actions can be rather long.

As depicted in the system 10 depicted in FIG. 1, the traffic capturing devices 2 are connected to the computing device 1 by a wired method, for example, using a network cable. The capturing device 2 can be implemented as at least one of the: an L2-level network switch operating using network traffic mirroring technology of the network segments, such as, for example, SPAN-technology for mirroring network traffic in CISCO equipment, network transparency tools, also called to the Security Delivery Platform or Network Packet Brokers (NPB), and Test Access Points of various types, as well as proxy servers with ICAP-Protocol support, working within the established TCP-connection, mail servers with SMTP-Protocol support, etc.

In one of the non-limiting embodiments of the present technology, the computing device 1 can be part of the data transfer network 3 or can be coupled to the data transfer network 3, such that the computing device 1 is configured to extract or capture network traffic from the data transfer network 3 for further analysis and processing in order to detect malicious domain names in the network traffic. In other words, in such an implementation, the computing device 1 may have the functionality of traffic capturing devices 2 described above. In some non-limiting embodiments of the present technology, the computing device 1 may use a secure data transmission/reception channel to receive network traffic extracted from data transfer network 3.

In another non-limiting embodiment of the present technology, the above-described network traffic capturing devices 2 may be embedded or integrated into the computing device 1.

In some non-limiting embodiments of the present technology, the computing device 1 may be connected to the traffic capturing devices 2 via a wireless connection.

Computing Device

In the non-limiting embodiments of the system 10 depicted in FIG. 1, the computing device 1 is implemented as a hardware-software complex and comprises a communication module 1.1, a filtering module 1.2, an analyzing module 1.3, a processing module 1.4 and a local data storage 1.5, each of which is connected to a communication bus 1.6. Each of the communication module 1.1, the filtering module 1.2, the analyzing module 1.3 and the processing module 1.4 is configured to exchange data, using the communication bus 1.6. The local data storage 1.5 and the communication module 1.1 are configured to exchange data with the filtering module 1.2, which in turn is configured to exchange data, using the communication bus 1. with the analyzing module 1.3, and the analyzing module 1.3 is configured to exchange data, using the communication bus 1.6, with the processing module 1.4.

Local Storage Database

The local data storage 1.5 is configured to store executable software instructions that can control the operation of the communication module 1.1, the filtering module 1.2, the analyzing module 1.3 and the processing module 1.4. In addition, the local data storage 1.5 is used for storing data used in the operation of the computing device 1.

In particular, data on the available analytical reports can be stored in the local data repository 1.5, each of which is assigned to a specific domain name and each of which contains data on the numerical values assigned by the analyzing module 1.3 to a specified set of features of suspiciousness characterizing the specific domain name as well as data related to a determination made by the processing module 1.4 in relation to the domain name being analyzed. In particular, data on the set of analysis rules used by the processing module 1.4 to analyze the set of features of suspiciousness, and data on the final determination rendered regarding the harmfulness of the analyzed domain name, as will be described in more detail below.

The local data storage 1.5 can also store data in regard to known domain names and data in regard to language dictionaries. It should be noted that the well-known domain names in the data stored in the local data storage 1.5 can be representative of, for example, the 10,000 most popular sites from lists of popular sites hosted, for example, on rating sites such as alexa.com, webomer.com, trends.google.com, etc. As language dictionaries stored in the local data storage 1.5, various language dictionaries can be used, including dictionaries of abbreviations, slang words, various professional terms, etc., while dictionaries of the Russian language and other languages that are not of Latin alphabet based languages can be stored in a Latin alphabet transliterated form.

In one embodiment of the present invention, the computing device 1, in particular its analyzing module 1.3, may periodically, after a specified period of time establish a connection with at least one of the above rating sites or access them using the connection module 1.6 in order to extract from the so-accessed rating sites at least one list of popular sites for updating data associated with the known domain names that is stored in the local storage 1.5 data. The updating can be executed on the basis of the list of popular sites from a given one of these rating sites (or lists from multiple rating sites), as well as a summary list of popular sites compiled by the analyzing module 1.3 on the basis of separate lists of popular domain names obtained from each of these rating sites, by, for example, a comparative assessment of popularity indicators assigned to sites in these separate lists, in accordance with a given set of evaluation rules to identify a given number of the most popular sites.

In some non-limiting embodiments of the present technology, at least some of the above data stored in a local storage 1.5 data can be stored in a cloud data storage (not shown), while this data can be located both on a single remote file server included in the data transfer network 3 or in a different data network than the data transfer network 3, and on a set of remote file servers distributed in the data transfer network 3 or in a different data transfer network 3. In this case, the computing device 1 can be configured to establish a connection for the purposes of the data exchange, in particular a secure communication channel for receiving/transmitting data, with such a cloud data storage using a wired and/or wireless connection method. In those embodiments, wherein the computing device 1 connected to the data transfer network 3 is connected to the cloud data storage via at least one other data network other than the data transfer data transfer network 3, the computing device 1 can utilize at least one switching device, such as network hubs, also known as network hubs, network routers, and other known switching devices.

In one of the non-limiting embodiments of the present technology, the computing device 1 may comprise a separate local storage of analytical reports (not shown), designed to store data about existing analytical reports. Such a separate local repository of analytical reports can be connected via the communication bus 1.6 to the filtering module 1.2, allowing the filtering module 1.2 to access such local repository of analytical reports to retrieve data in regard to the available analytical reports from therefrom. The separate local repository can also be to the processing module 1.4 connected via the communication bus 1.6, the processing module 1.4 being configured to access to such a local repository of analytical reports for storing new analytical report, which is described in more detail below.

In another embodiment of the present technology, the data in regard to the available analytical reports can be stored in a separate remote analytical report storage (not shown), while the filtering module 1.2 can be configured to connect, using the communication module 1.1, with which the filtering module 1.2 is connected via the communication bus 1.6, to such the remote analytical report store to obtain data in regard to the available analytical reports therefrom for the purpose of their subsequent use to identify domain names, previously analyzed with the help of the computing device 1. The processing module 1.4 can be configured to connect, using the communication module 1.1, with which the processing module 1.4 is connected using the communication bus 1.6, to such the remote storage of analytical reports for storing a new analytical report generated by the processing module 1.4 in relation to the analyzed domain name, which is described in more detail below.

In one of the embodiments of the present technology, the computing device 1 may comprise a separate local storage of domain names (not shown), designed to store data in regard to known domain names. Such local storage of domain names can be connected via the communication bus 1.6 to the analyzing module 1.3, allowing the analyzing module

1.3 to access such local storage of domain names to retrieve data about known domain names therefrom for later use to determine the numerical value appropriate feature of suspiciousness for the analyzed domain name, as described in more detail below.

In another embodiment of the present technology, there may be a separate remote domain name storage (not shown) for storing data in regard to known domain names, and the analyzing module 1.3 can be configured to connect using the communication module 1.1, with which the analyzing module 1.3 is connected via the communication bus 1.6 to such the remote storage of domain names in order to obtain data in regard to known domain names therefrom with a view to their subsequent use for determining the numerical value of the corresponding feature of suspiciousness for the analyzed domain name, which is described in more detail below.

In one of the embodiments of the present technology, the computing device 1 may comprise a separate local storage of dictionaries (not shown) for storing data in regard to existing language dictionaries. Such local storage of dictionaries can be connected via the communication bus 1.6 to the analyzing module 1.3 for the analyzing module 1.3 to access such local storage of dictionaries to obtain data therefrom in regard to existing language dictionaries for the purpose of their subsequent use for determining the numerical value of the corresponding attribute suspicion for the analyzed domain name, as described in more detail below.

In another embodiment of the present technology, there may be a separate remote dictionary storage (not shown) for storing data in regard to existing language dictionaries, and the analyzing module 1.3 can be configured to connect using the communication module 1.1 with which the analyzing module 1.3 is connected via the communication bus 1.6 to such the remote storage of dictionaries to retrieve data therefrom in regard to the existing language dictionaries for the purpose of their subsequent use for determining the numerical value of the corresponding feature of suspiciousness for the analyzed domain name, as described in more detail below.

The filtering module 1.2, the analyzing module 1.3, and the processing module 1.4 can be implemented as a single processor, such as a general-purpose processor or a special-purpose processor (for example, processors for digital signal processing, specialized integrated circuits, etc.). Thus, the processor implementing the filtering module 1.2, analyzing module 1.3, and processing module 1.4 in the computing device 1 can be configured to execute program instructions stored in the local storage 1.5 data for the implementation of the functionality of the filtering module 1.2 for extracting domain names from data packets in the received network traffic, the functionality of the analyzing module 1.3 to determine the numerical values of features of suspiciousness for the analyzed domain name and the functionality of the processing module 1.4 to make a final determination regarding the harmfulness of the analyzed domain name using the resulting set of feature of suspiciousness in the numerical values assigned to them.

In one of the embodiments of the present technology, each of the filtering module 1.2, the analyzing module 1.3, and the processing module 1.4 can be implemented as at least one separate processor. In this non-limiting embodiment, a first processor used in the computing device 1 for implementing the filtering module 1.2 can be configured to execute software instructions stored in the local data storage 1.5 and execute the functionality of the filtering module 1.2 to extract domain names from the data packets in the received network traffic. A second processor implementing the analyzing module 1.3 can be configured to execute software instructions stored in the local data storage 1.5 and execute the implementation of the functionality of the analyzing module 1.3 for determining the numerical values of feature of suspiciousness for the analyzed domain name A third processor used in the computing device 1 to implement the processing module 1.4 can be configured to execute software instructions stored in the local data storage 1.5 and execute the functionality of the processing module 1.4 to make a final determination regarding the harmfulness of the analyzed domain name using the obtained a set of features of suspiciousness with the numerical values assigned to them.

The local data storage 1.5 may be implemented, for example, in the form of one or more computer-readable media for long-term data storage. In some embodiments of the present technology, the local data storage 1.5 may be implemented using a single physical device (for example, one optical storage device, magnetic storage device, organic storage device or another type of storage device, or storage on disks), and in other embodiments the local data storage 1.5 can be implemented using two or more physical devices.

Communications Module

In the non-limiting embodiments of the computing device 1 of the system 10 depicted in FIG. 1, the communication module 1.1 is wired, for example, using a coaxial cable, twisted pair, fiber optic cable or other physical connection, to traffic capture devices 2 for receiving network traffic therefrom. Thus, the communication module 1.1 is configured to connect to one or more of the above-described traffic capture devices 2 that form part of the data transfer network 3, and to receive network traffic extracted by said devices 2 to capture traffic from the data transfer network 3.

In another embodiment of the present technology, the communication module 1.1 may be wirelessly connected to the traffic capturing devices 2, for example using a communication line based on WiFi™ technology, a communication line based on 3G technology, a communication line based on LTE technology, etc.

In those embodiments of the present technology where the above-described cloud data storage is used to store various data used in the operation of the computing device 1, the communication module 1.1 can be connected to the cloud data storage wirelessly, for example, using a communication line based on WiFi technology, communication lines based on 3G technology, communication lines based on LTE technology and/or communication lines based on other known wireless communication technology.

The communication module 1.1 can be implemented as a network adapter equipped with the necessary connectors for connecting the necessary types of physical cables depending on the types of physical connections used to communicate with the traffic capturing devices 2. In one embodiment of the present technology, the communication module 1.1 may be implemented as a network adapter in the form of a WiFi adapter, a 3G adapter, an LTE adapter, or another wireless communication adapter depending on the type of wireless link used to provide communication any external devices and remote data storages that can establish a wireless channel of communication with the computing device to exchange necessary data with it.

Thus, the communication module 1.1 can be configured to receive input data from one or more devices in a wired and/or wireless manner, as well as configured for sending output data to other devices in a wired manner and/or wirelessly.

The communication module 1.1 may also be a known communication device, such as a transmitter, receiver, transceiver, modem and/or network interface card for exchanging data with external devices of any type via a wired or wireless communication network, for example using an Ethernet network connection, digital subscriber line (DSL), telephone line, coaxial cable, cellular telephone system, etc.

In some embodiments of the present technology, network traffic received by communication module 1.1 may be at least temporarily stored in the local data storage 1.5. In other embodiments of the present technology, the traffic received by the communication module 1.1 may be at least temporarily stored in a separate network traffic network storage (not shown), different from the local data storage 1.5 and connected, via the communication bus 1.6, to the communication module 1.1. In other embodiments of the present technology, the network traffic received by the communication module 1.1 may be at least temporarily stored in a separate remote network traffic storage (not shown) connected to the communication module 1.1 using a wired and/or wireless method for exchanging data therewith.

Filtering Module

In the non-limiting example of the computing device 1 of the system 10 depicted in FIG. 1, the filtering module 1.2 is configured to connect, via the communication bus 1.6, to the communication module 1.1 so as to receive captured network traffic. The filtering module 1.2 extracts a plurality of individual data packets from the received network traffic using, for example, known techniques for extracting data packets based on open source software, such as Surikata, Bro, Kuko, etc. technologies, including various improvements thereof. The filtering module 1.2 is also configured to analyze each of the plurality of extracted data packets, with an aim of the extraction of at least one domain name therefrom.

In those embodiments of the present technology in which the received network traffic is stored in the local data storage 1.5, the filtering module 1.2 can be configured to access the local data storage 1.5 using the communication bus 1.6 to retrieve the stored network traffic for the subsequent extraction of data packets therefrom, as described above. In those embodiments of the present technology, in which the received network traffic is stored in a separate local storage of network traffic (not shown), the filtering module 1.2 can be configured to access to such local storage of network traffic using the communication bus 1.6 for the retrieval of saved network traffic therefrom for subsequent retrieval of multiple data packets therefrom, as described above. In those embodiment of the present technology, in which the received network traffic is stored in a separate remote network traffic repository (not shown), the filtering module 1.2 can be configured to access such remote network traffic storage using the communication module 1.1 connected to the filtering module 1.2 via the communication bus 1.6, for extraction of the saved network traffic therefrom for subsequent retrieval of multiple data packets therefrom, as described above.

In one embodiment of the present technology, the data packets extracted by the filtering module 1.2 from the received network traffic can be stored in the local data storage 1.5, while the filtering module 1.2 is configured to access the local data storage 1.5 for extracting the stored data packets that have been extracted from the received network traffic, for the subsequent analysis thereof for extracting at least one domain name. In another embodiment of the present technology, the data packets extracted by the filtering module 1.2 from the received network traffic can be stored in a separate local data storage (not shown) other than the local data storage 1.5, while the filtering module 1.2 can be configured to access such local data storage for the retrieval of the stored data packets that have been extracted from the received network traffic, for the subsequent analysis for extracting at least one domain name. In another embodiment of the present technology, the data packets extracted by the filtering module 1.2 from the received network traffic can be stored in a separate remote data storage (not shown), while the filtering module 1.2 can be configured to access such the remote data store for retrieving the stored data packets that have been extracted from the received network traffic for the further analysis for extraction of at least one domain name.

In one embodiment of the present technology, the domain names extracted by the filtering module 1.2 from a plurality of data packets extracted from the received network traffic can be stored in the local data storage 1.5, and the filtering module 1.2 can be configured to access the local data storage 1.5 for retrieval of stored domain names for subsequent transfer to the analyzing module 1.3. In another embodiment of the present technology, the domain names extracted by the filtering module 1.2 from a plurality of data packets extracted from the received network traffic can be stored in a separate local data store (not shown) other than the local data storage 1.5, while the filtering module 1.2 may be configured to access such local data storage for retrieval of stored domain names for the subsequent transfer to the analyzing module 1.3. In another embodiment of the present technology, the domain names extracted by the filtering module 1.2 from a plurality of data packets extracted from the received network traffic can be stored in a separate remote data repository (not shown), while the filtering module 1.2 can be configured to access such remote data storage for the extraction of domain names for the subsequent transmission to the analyzing module 1.3.

Further, after extracting pf the domain names from the data packets being analyzed, the filtering module 1.2 can additionally determine whether there is an analytical report for each of these extracted domain names.

To detect the presence of an analytical report, the filtering module 1.2 performs at least the following operations: (i) accesses to the local data storage 1.5 in order to receive data in regard to the available analytical reports, each of which is supplied in accordance with the specific domain name for which this analytical report was created, (ii) establishes, by a character-by-character comparison of each of the extracted domain names with domain names identifying analytical reports in the retrieved data, the correspondence of each of the extracted domain names to one of the available analytical reports. Thus, the filtering module 1.2 compares each extracted domain name with domain names that identify behavioural reports in the obtained analytical reports, and a match between the extracted domain name and the domain name that identifies one of the available analytical reports means that for the extracted domain name there is already an analytical report stored in the local data storage 1.5, which indicates that the extracted domain name has already been analyzed by computing device 1, in particular by the processing module 1.4.

In an embodiment in which data on analytical reports is stored in a separate local storage of analytical reports (not shown), the filtering module 1.2 is configured to access such local repository of analytical reports for retrieval of the data in regard to the available analytical reports, each of which reports is assigned to a specific domain name for which this analytical report was created to further determine a match of the extracted domain name with one of the available analytical reports. In an embodiment in which data on analytical reports are stored in a separate remote storage of analytical reports (not shown), the filtering module 1.2 is configured to access such remote repository of analytical reports for retrieving the data in regard to the available analytical reports, each of which is aligned with a specific domain name for which this analysis report was created, in order to further determine a match of the extracted domain name with one of the available analysis reports.

Further, the filtering module 1.2 transfers to the analyzing module 1.3 only those extracted domain names for which there is no analytical report in the local data storage 1.5, that is, only those domain names that have not been previously analyzed by computing device 1, in particular by the processing module 1.4.

Thus, according to the above description of the functionality of the filtering module 1.2, the filtering module 1.2 provides the ability to filter at least part of the domain names extracted from the data packets of the received network traffic using the minimum computing resources of the computing device 1, which can speed up the process of identifying the malicious domain names in network traffic.

Analyzing Module

In the depicted embodiment of the computing device 1 of the system 10 depicted in FIG. 1, the analyzing module 1.3 is configured to connect to the filtering module 1.2 for receiving an indication of domain names therefrom, for which the filtering module 1.2 determined absence of an analytical report, as described above.

In an embodiment of the present technology in which the domain names extracted by the filtering module 1.2 are stored in the local data storage 1.5, the analyzing module 1.3 accesses the local data storage 1.5 using the communication bus 1.6 for receiving the data in regard to the extracted domain names to be further analyzed in this analyzing module 1.3, as will be described below.

In another embodiment of the present technology, in which the domain names extracted by the filtering module 1.2 are stored in a separate local data storage, the analyzing module 1.3 accesses to such local data storage for receiving therefrom data in regard to the extracted domain names to be further analyzed in this analyzing module 1.3, as will be described below.

In another embodiment of the present technology, in which the domain names extracted by the filtering module 1.2 are stored in a separate remote data storage, the analyzing module 1.3 accesses such separate remote data storage using the communication module 1.1 connected to the analyzing module 1.3 using the communication bus 1.6, for retrieval the data in regard to the extracted domain names, which data is subject to further analysis in this analyzing module 1.3, as will be described below.

The analyzing module 1.3 analyzes each of the obtained domain names using a given one or a given set of methods of analyzing suspiciousness. Each of such methods is associated with a set of features and rules used for determining suspiciousness. As such, the analyzing module 1.3 is configured to generate a given numerical value for a given domain name based on a given set of feature associated with the method(s) used by the analyzing module 1.3.

In one embodiment of the present technology, the analyzing module 1.3 can be equipped with a special framework (software platform) that allows, for example, the operator or the user of a computing device 1 to change the specified set of methods for analyzing suspiciousness used by the analyzing module 1.3 to generate the given numerical value for the suspiciousness of the given domain name. For example, an operator may to set or add new methods for analyzing suspiciousness, which can be used by the processing module 1.4, which allows to expand the functionality of the analyzing module 1.3 and the computing device 1 as a whole.

In one example, the analyzing module 1.3 employing a give suspiciousness analyzing technique, can use a length of the domain name as a feature for determining the numeric value. When analyzing the obtained domain names using this method of suspicion analysis, the analyzing module 1.3 performs at least the following operations: (i) determines the number of characters in each of the received domain names, (ii) determines whether a certain number of characters of each analyzed domain name corresponds to a specified threshold value of the domain name length, which can be set either manually by the operator/user of the computing device 1 or automatically using the specified rules for determining the threshold value for the length of the domain name, (iii) assigns a numerical value to the feature of a domain name suspiciousness, which represents the length of the analyzed domain name, depending on the result of the matching step above.

In one embodiment of the technology, if a domain name suspiciousness analysis method uses the domain name length as one of the features, the threshold value of the domain name length can be set automatically, for example as follows: the analyzing module 1.3 can get data in regard to the known domain names that can be stored in the local data storage 1.5, a another local domain name storage, or a separate remote domain name storage, and then calculate, for example, the average length of the known domain names. The analyzing module 1.3 is then configured to use this calculated value as a threshold value of length of a domain name. In another embodiment of the present technology, the analyzing module 1.3 is configured to process the length values of known domain names in the data obtained by the analyzing module 1.3 to calculate the threshold length of the domain name based on them that is used by the analyzing module 1.3.

As another example of the suspiciousness analysis method that can be used by the analyzing module 1.3, the analyzing module 1.3 can use a popularity of the analyzed domain name as a feature for determining the numerical value representative of the suspiciousness of the analysed domain name. When analyzing the obtained domain names using this method of suspicion analysis, the analyzing module 1.3 performs at least the following operations: (i) establishes a connection with the local data store 1.5 (or a separate local or remote domain name store depending on the implementation option, as described above) to obtain from it a set of known domain names, (ii) establishes, by executing a symbol by symbol comparison of each of the extracted domain names with the domain names in the resulting set of domain names, to determine a match of the extracted domain names with one of the known domain names and (iii) generates (or updates) the numerical value of the domain name suspiciousness, which is based on the popularity of the analyzed domain name, depending on the result of establishing the match.

As another example of the suspiciousness analysis method that can be used by the analyzing module 1.3, the analyzing module 1.3 can use entropy of the analyzed domain name as a feature for determining (or updating) the numerical value representative of the suspiciousness of the analysed domain name. When analyzing the obtained domain names using this method of suspicion analysis, the analyzing module 1.3 performs at least the following operations: (i) determines the frequency of occurrence of each of the set of N-grams in each of the obtained domain names, each n-gram corresponds to a combination of N consecutive characters, (ii) determines the entropy of the N-gram of the analyzed domain name as a function of a certain frequency of occurrence of each N-gram in the analyzed domain name, (iii) compares the entropy of the N-gram of the domain name under analysis with a given threshold of the N-gram entropy, and (iv) generates given numerical value of the domain name suspiciousness representing the entropy of the analyzed domain name, depending on the result of the comparison. Thus, this method of analyzing suspiciousness allows to obtain, for example, the numerical values of three feature of suspiciousness of the analyzed domain name, representing each entropy of the analyzed domain name, respectively, for example, for 2-gram, 3-gram and 4-gram (this is an example of a possible combination of consecutive characters).

In one embodiment of the present technology, the number of consecutive characters in a combination corresponding to an N-gram used for determining entropy in a suspiciousness analysis technique can be set manually by an operator of the computing device 1 or can be set automatically. As an example of an automatic determination, the number of the characters can be set depending on the above described threshold for the length of a domain name or the average length of known domain names, which can be determined the analyzing module 1.3 using, for example, data in regard to the known domain names from the local data storage 1.5, as described in more detail above, or in accordance with any other specified rule.

As another example of the suspiciousness analysis method that can be used by the analyzing module 1.3, the analyzing module 1.3 can use meaningfulness of the analyzed domain name as a feature for determining (or updating) the numerical value representative of the suspiciousness of the analysed domain name. When analyzing the resulting domain names using this suspiciousness analysis method, the analyzing module 1.3 performs at least the following operations: (i) accesses the local data store 1.5 (or a separate local or remote domain name store depending on the implementation option, as described above) to obtain data in regard to the language dictionaries, (ii) extracts at least one word from each of the of the analyzed domain names, (iii) establishes a match of each of the extracted words with one of the words in the language dictionaries from the retrieved words, (iii) generates the given numerical value to the domain name suspiciousness, representing the meaningfulness of the analyzed domain name based on such the match (or lack thereof).

In one embodiment of the present technology, in the case of using a method of analyzing the suspiciousness of a domain name on the basis of its meaningfulness, when determining the match of a word extracted from the analyzed domain name with one of the words in the language dictionaries, the analyzing module 1.3 additionally checks whether the extracted word matches any of the words in the language dictionaries when writing this extracted word in reverse order and/or whether a meaningful part of this extracted word matches (for example, a common abbreviation of such word) with one of the words in the resulting dictionaries. Furthermore the given numerical value to the domain name suspiciousness, can be further base on the comparison of such abbreviations (as an example, of the meaningful part of the word comparison).

In at least some non-limiting embodiments of the present technology, the analyzing module 1.3 can additionally, after extracting at least one word from each of the obtained domain names, identify a language of the specified extracted word, and if it's established that this extracted word is written in a language other than a Latin alphabet based language (for example, in Russian) to transliterate it in the Latin alphabet in accordance with a set of the transliteration rules. In another embodiment of the present technology, the analyzing module 1.3 can be additionally configured to establish a connection, using the communication module 1.1, with a source of language dictionaries to retrieve data associated with a new dictionary. The analyzing module 1.3 can then update the existing language dictionaries stored in the local data storage 1.5, on the basis of this new dictionary. The analyzing module 1.3 can also identify the language of words of this new dictionary, and if the words in this new dictionary are written in a language other than Latin alphabet based language (for example, in Russian), it can transliterate all the words from this new dictionary into the Latin alphabet in accordance with the given set of transliteration rules.

As another example of the suspiciousness analysis method that can be used by the analyzing module 1.3, the analyzing module 1.3 can use correctness of spelling of the analyzed domain name as a feature for determining (or updating) the numerical value representative of the suspiciousness of the analysed domain name. When analyzing the resulting domain names using this suspect analysis method, the analysis module 1.3 performs at least the following operations: (i) establishes a link with the local data storage 1.5 (a separate local or remote domain name store depending on the implementation option, as described above) to obtain data in regards to the language dictionaries from it, (ii) extracts at least one word from each of the analyzed domain name, (iii) determines the Levenshtein distance between each of the extracted words and the corresponding word in the language dictionaries, (iv) compare a given Levenshtein distance with a given threshold value, which, for example, can be a constant equal to two (2), (v) assigns a given numerical value to the domain name suspiciousness, representing the correctness of the spelling of the analyzed domain name, depending on the result of the comparison (in particular, depending on the types of errors when spelling the analyzed domain name).

As a result of applying one or more of the above-described suspiciousness analysis methods to each domain name analyzed by the analyzing module 1.3, the analyzing module 1.3 creates a separate log file with analysis results of a given analyzed domain name in the analyzing module 1.3, which contains at least numerical values assigned by the analyzing module 1.3 based on the above described features of suspiciousness, characterizing the specified specific domain name and corresponding to each one of the applied methods for the analysis of suspiciousness.

In one embodiment of the present technology, the communication module 1.1 may be further configured to establish communication with at least one local or remote source of domain names for receiving at least one domain name or sets of domain names for their subsequent transfer to the analyzing module 1.3 for the analysis of each of these obtained domain names using a given set of analysis methods, as it described in detail above. Such sources of domain names can include at least one of the following local or remote sources: a remote computing device, server, host, domain, database, antivirus system or program, website, etc.

Processing Module

In the non-limiting embodiment of the computing device 1 of the system 10 depicted in FIG. 1, the processing module 1.4 is configured to connect to the analyzing module 1.3 for receiving log files generated by the analyzing module 1.3, as described above.

The processing module 1.4 analyzes the features of a domain name suspiciousness based on the assigned numerical values contained in each of the received log files using a specified set of analysis rules such that each domain name for which the corresponding log file was created is classified as (i) malicious domain names, if the results of the analysis of the features of suspiciousness are characteristic of malicious domain names, or (ii) trusted domain names, if the results of the analysis of the features of suspiciousness are characteristic for trusted domain names. Thus, the processing module 1.4 makes the final determination regarding the harmfulness of the domain name using the log file created by the analyzing module 1.3 for each extracted domain name.

In particular, the processing module 1.4 is based on a previously trained classifier, which makes the determination regarding the harmfulness of a specific domain name using a set of feature of the domain name suspiciousness based on its assigned numerical values, which the processing module 1.4 extracts using known algorithms or scripts from the log file obtained from the analyzing module 1.3. Each of the used set of feature of suspiciousness reflects one of the characteristics of a particular domain name that the analyzing module 1.3 has analyzed, and is indicative of the potential maliciousness of the specific domain name, and the numerical value assigned to the specific domain name reflects the degree of its suspiciousness. The pre-trained classifier used in the processing module 1.4 can be a classifier based on one of the known machine learning algorithms (MLA). The classifier can be, for example, based on the machine learning algorithm "Random Forest", based on the machine learning algorithm "gBoost", based on the machine learning algorithm "AdaBoost", etc. The classifier on the basis of one of the MLA algorithms makes its determination on the harmfulness of each domain name based on the extracted weighted features of suspiciousness obtained as a result of assigning a given weight to each of the set of features of a domain name suspiciousness extracted from the resulting log file, and other static (not having a given weight) features using an algorithm that implements, for example, the most effective decision tree selected at the algorithm training stage by experts using known malicious domain names.

In one of the embodiment of the present technology, the processing module 1.4 can be based on a set of pre-trained classifiers, each of which makes its determination regarding the harmfulness of a specific domain name using the same set of feature of the domain name suspiciousness and their numerical values, while, for example. In some non-limiting embodiments of the present technology, the final determination regarding the safety of a domain name can be made by the processing module 1.4 based on individual determinations of the classifiers. For example, in the case in which at least one of the specified set of classifiers has determined the domain name to be unsafe/malicious the processing module 1.4 may generate a final determination regarding the harmfulness of the domain name. In another variation of this embodiment, the processing module 1.4 can render its final determination regarding the harmfulness of the domain name by comparing the total weight of individual determinations generated by a given set of classifiers of the processing module 1.4, with a given threshold value, which is can be a constant, while any individual determination rendered by each classifier from the given set of classifiers is assigned its own prior given weighting. Thus, the processing module 1.4 generates the determination, taking into account all individual determinations (intermediate determinations) of the classifiers that have a given weight in the total weight taken into account by the processing module 1.4 for rendering the final determination.

After the final determination is rendered, the processing module 1.4 generates a separate analytical report for each domain name analyzed by the processing module 1.4, and this analytical report contains at least the information from the corresponding log file created by the analyzing module 1.3 for the domain name, as well as the final determination rendered by the processing module 1.4 with respect to the domain name, as well as data on the classifier used by the processing module 1.4 for the final determination. In the embodiment of the present technology, in which several classifiers are used in the operation of the processing module 1.4, the analytical report generated by the processing module 1.4 may also contain data on each of the classifiers used by the processing module 1.4 to render the final determination, and individual (intermediate) determinations thereof in respect to the harmfulness of the domain name made by each of these classifiers.

In some embodiments of the present technology, the processing module 1.4 can be equipped with a special framework (software platform), allowing, for example, the operator of the computing device 1 to make changes to a given set of classifiers used by the processing module 1.4 to make a final determination on the harmfulness domain name as described in more detail above.

In addition, in the case when the processing module 1.4 makes a final determination indicative of the harmfulness of a given domain name, the processing module 1.4 can also perform at least one of the following actions: issue a warning message that a malicious domain name is detected in network traffic and block network traffic from an infected device or infected devices, which can be identified by their IP-address as defined by the revealed a malicious domain name.

To store the analytical report in the local data storage 1.5, the processing module 1.4 accesses the local data storage 1.5 for the transfer of the analytical report to the local data storage 1.5 to save it in this local data storage 1.5.

In the embodiment of the present technology, in the analytical report is stored in a separate local storage of analytical reports (not shown), the processing module 1.4 accesses such local storage of analytical reports for storage of the rendered report in this local repository of analytical reports.

In the embodiment of the present technology, in which the generated analytical report is stored in a separate remote repository of analytical reports (not shown), the processing module 1.4 accesses such remote repository of analytical reports for the transfer of the analytical report to the remote analytical report storage by wired and/or wireless one way to save the rendered analytical report in this remote repository of analytical reports.

It should be noted that communication module 1.1, filtering module 1.2, analyzing module 1.3, and processing module 1.4 implement their above functions in substantially real time, that is, the communication module 1.1 continuously receives network traffic, filtering module 1.2 performs its filtering operations at least part of the domain names extracted from the data packets in the received network traffic, the analyzing module 1.3 performs its operations to analyze domain names and assign the specified numerical values to the feature of suspiciousness, followed by the creation of a log file for each domain name separately, and the processing module 1.4 performs its operations to analyze at least part of the log files obtained from the analyzing module 1.3, and save at least part of the created or prepared analytical reports in the local data storage 1.5.

In one of the embodiments of the present technology, the analyzing module 1.3 and the processing module 1.4 can be combined, for example, into a single module for detecting malicious domain names, having all the above-described functionalities inherent in the analyzing module 1.3 and the processing module 1.4. In another embodiment of the present technology, the filtering module 1.2 and the analyzing module 1.3 can be combined, for example, into a single pre processing module having all the above-described functionalities inherent in the filtering module 1.2 and the analyzing module 1.3. In other embodiments of the present technology, the filtering module 1.2, the analyzing module 1.3 and the processing module 1.4 can be combined, for example, into a single module for identifying malicious domain names that has all the above-described functionality inherent in the filtering module 1.2, the analyzing module 1.3 and the processing module 1.4.

In another embodiment of the present technology, communication module 1.1 may be divided into several separate communication modules, each of which provides at least one of the known methods of wired and/or wireless communication in computing device 1.

In some embodiments of the present technology, the analyzing module 1.3 can be divided into several independent modules, each of which can perform at least one of the above-described functionalities inherent in the analyzing module 1.3, and which are adapted to communicate with each other and the rest of device 1 via communication bus 1.6. In this case, one of such independent modules can be configured to create a log file, as described above, or there may be, for example, an additional module for creating log files, configured to communicate with these independent modules using, for example, bus 1.6 ensuring that each of them receives, for example, data on a specific feature of suspiciousness with a numerical value assigned to it for the same domain name.

In other embodiments of the present technology, the processing module 1.4 can be divided into several independent modules, each of which can, for example, implement one of the above-described pre-trained classifiers that underlie the processing module 1.4, while these independent modules can be configured to communicate with each other and with the rest of the design modules of the computing device 1, in particular with the analyzing module 1.3, using the communication bus 1.6. In this case, one of such independent modules can be configured to create an analytical report, as described above, or there can be, for example, an additional module for creating analytical reports, configured to communicate with these independent modules using, for example, communication bus 1.6 for obtaining data from them about the results of the analysis of the received log file using the specified set of analysis rules for creating an analytical report for a specific domain name.

In another embodiment of the present technology, the filtering module 1.2 can be divided into several other independent modules, each of which can perform at least one of the above-described functionalities of the filtering module 1.2, and which are configured to communicate with each other and the other structural modules computing device 1, in particular with the communication module 1.1 and the analyzing module 1.3, using the communication bus 1.6.

In other embodiments of the present technology, each classifier from a predetermined set of classifiers used in the processing module 1.4 can be implemented as a separate classifying module, rendering its determinations regarding the harmfulness of a particular domain name, with the individual classifying modules being configured to communicate with the processing module 1.4 using, for example, the communication bus 1.6, and the processing module 1.4 in this case can make a final determination on the harmfulness of a domain name using a given set of rules for making a final decision and personal decisions made by the classifying modules.

According to one embodiment of the present technology, at least some of the above-described functionality of the filtering module 1.2, the analyzing module 1.3 and/or the processing module 1.4 can be implemented as a separate functional submodule or functional block included in the corresponding one of the modules 1.2, 1.3 and 1.4. Thus, the filtering module 1.2 can contain several of its submodules, each of which implements at least one of the above-described functional capabilities of the filtering module 1.2, the analyzing module 1.3 can contain several of its submodules, each of which implements at least one of the above-described functional capabilities of the analyzing module 1.3, and the processing module 1.4 may contain several of its submodules, each of which implements at least one of the above functional capabilities of the processing unit 1.4.

Thus, the above-described functionality of the filtering module 1.2 provides the ability to effectively filter at least part of domain names extracted from network traffic data packets, resulting in the subsequent analysis of domain names in the analyzing module 1.3 and the processing module requiring significantly less computational resources allocated computing device 1. In addition, the above-described functionality of the filtering analyzing module 1.3 makes it possible to efficiently assign a set of features of suspiciousness with assigned numerical values for each domain name, and the above-described functionality of the processing module 1.4 provides the ability to make an accurate and reliable determination of whether a given domain name is malicious.

Figure 2:
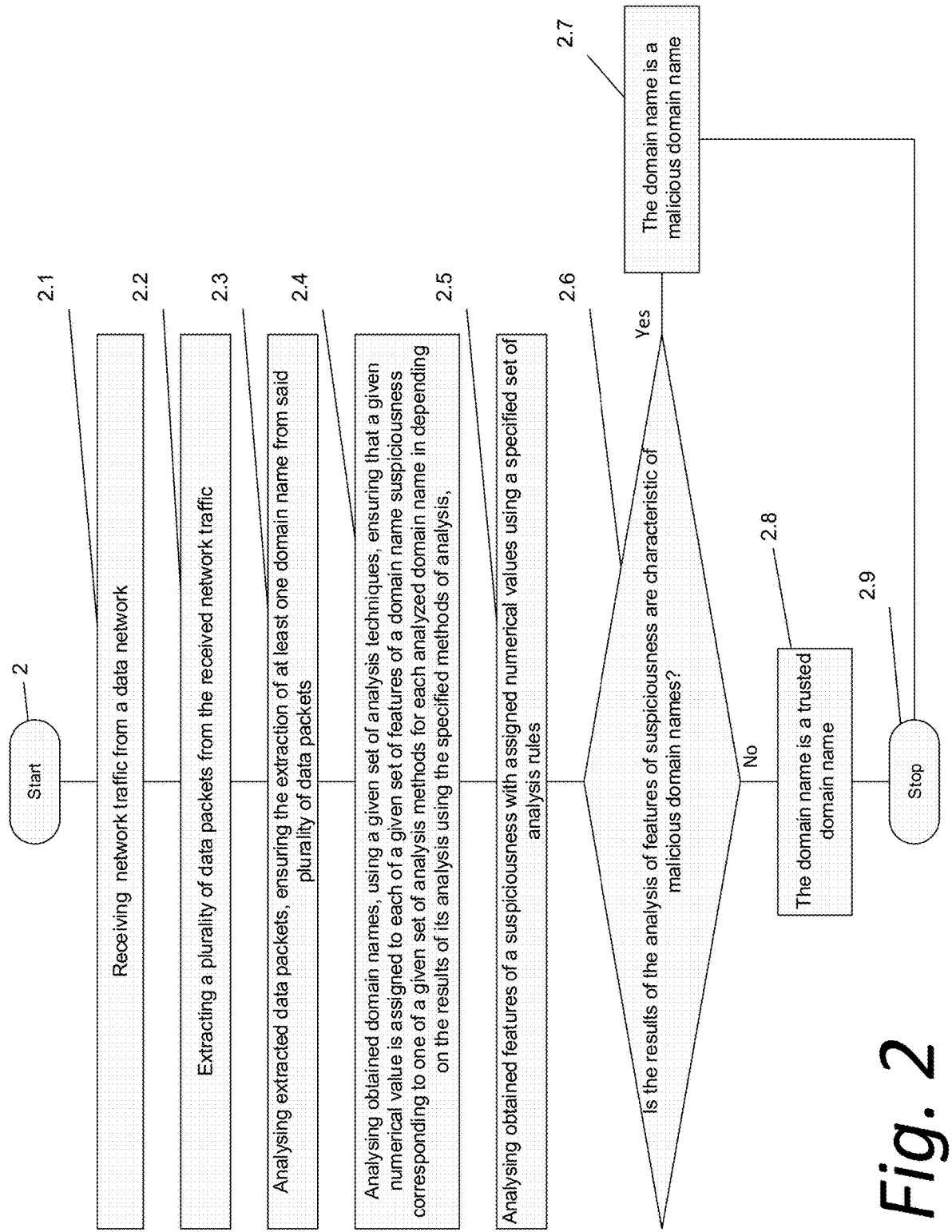
FIG. 2 depicts a block diagram of a method of operating a computing device used in the system shown in FIG. 1; the method being implementable in accordance with non-limiting embodiments of the present technology.

According to another aspect, there is provided a method for detecting malicious domain names in network traffic is proposed, depicted as a simplified flowchart in FIG. 2.

The method as depicted in FIG. 2 begins in block 2, according to which the presence of a computing device 1 for detecting malicious domain names in network traffic is provided, the structural units and functionality of which are described above. In block 2.1 of the method, network traffic from data transfer network 3 is received via the communication module 1.1. In block 2.2 of the method, a plurality of data packets is extracted from the received network traffic using a filtering module 1.2. In block 2.3 of the method, the extracted data packets are analyzed using the filtering module 1.2, for the extraction of at least one domain name from the specified set of data packets. In block 2.4, each of the obtained domain names is analyzed using the analyzing module 1.3 using a given set of analysis methods, such that a given numerical value is assigned to each of a given set of features of a domain name suspiciousness corresponding to one of a given set of analysis methods for each analyzed domain name depending on the results of its analysis using the specified methods of analysis. In block 2.5 of the method, the obtained features of a domain name suspiciousness with numerical values assigned to them are analyzed using the processing module 1.4 using a specified set of analysis rules. In block 2.6 of the method, it is determined, using the processing module 1.4, whether the analyzed features of suspiciousness with the assigned numerical values are characteristic of malicious domain names. If in block 2.6 of the method it was determined that the analyzed features of suspiciousness with the assigned numerical values are characteristic of malicious domain names (the "Yes" line in FIG. 2), the method proceeds to block 2.7 of the method according to which the domain name is determined to be a malicious domain name using the processing module 1.4, followed by the completion of the method in block 2.9 of the method. Otherwise, the method proceeds to block 2.8 (the "No" line in FIG. 2), according to which, using the processing module 1.4, the domain name is determined to be a trusted domain name, followed by completion of the method in block 2.9 of the method.

The operations in block 2.1 of the method include connecting, using the communication module 1.1, to at least one of the network traffic capturing devices included in the data network.

For the domain names extracted in block 2.3 of the method, it is further determined using the filtering module 1.2 whether there is an analytical report for each of these extracted domain names. The above operation of detecting the availability of an analytical report includes at least the following sub-steps: (i) obtaining data on analytical reports, (ii) determining if there is a match of each of the extracted domain names with one of the available analytical reports using a character-by-character comparison of each of the extracted domain names with domain names identifying the analytical reports.

In response to the fact that there is no analytical report for the extracted domain name, according to the non-limiting embodiments of the method, the filtering module 1.2 additionally transfers the domain name to the analyzing module 1.3.

According to the non-limiting embodiments of the method, the operations in block 2.4 include the execution, using the analyzing module 1.3, of at least the following sub-steps: (i) determining the number of characters in each of the obtained domain names; (ii) determining whether a certain number of characters correspond to each analyzed domain name given the threshold value of the length of the domain name; (iii) generating a given numerical value based on a feature of a domain name suspiciousness, representing the length of the analyzed domain name, depending on the result of establishing compliance.

According to the non-limiting embodiments of the method, the operations in block 2.4 also include performing, using the analyzing module 1.3, at least the following sub-steps: (i) obtaining a set of known domain names; (ii) establishing a match of each of the extracted domain names with one of the known domain names using a character-by-character comparison of each of the extracted domain names with domain names in the obtained set of domain names; (iii) generating a given numerical value to another feature of a domain name suspiciousness, representing the fame of the analyzed domain name, depending on the result of establishing a match.

According to the non-limiting embodiments of the method, the operations in block 2.4 also include the execution, using the analyzing module 1.3, of at least the following sub-steps: (i) determining N consecutive characters of a given analyzed domain name; (ii) determining the entropy of the N-gram of the analyzed domain name as a function of the specific frequency of occurrence of each N-gram in this analyzed domain name; (iii) comparing the determined entropy of the N-gram of the analyzed domain name with the specified threshold value of the entropy of the N-gram; (iv) generating a given numerical value to another feature of a domain name suspiciousness, representing the entropy of the domain name under analysis, depending on the result of the comparison.

According to the non-limiting embodiments of the method, the operations in block 2.4 also include the execution, using the analyzing module 1.3, of at least the following sub-steps: (i) obtaining an indication of language dictionaries; extracting at least one word from each of the obtained domain names; (ii) establishing a match of each of the specified extracted words with one of the words in the language dictionaries of the specified obtained data; (iii) generating a given numerical value to another feature of a domain name suspiciousness, representing the meaningfulness of the analyzed domain name, depending on the result of establishing a match.

According to the non-limiting embodiments of the method, the operations in block 2.4 also include the execution, using the analyzing module 1.3, of at least the following sub-steps: (i) obtaining indication of language dictionaries; (ii) extracting at least one word from each of the obtained domain names; (iii) determining the Levenshtein distance between each of the extracted words and the corresponding one of the words in the language dictionaries of the specified obtained data; (iv) comparing a certain Levenshtein distance with a given threshold value; (v) the assignment of a given numerical value to another feature of a domain name suspiciousness, representing the spelling of the analyzed domain name, depending on the result of the comparison.

According to the non-limiting embodiments of the method, the specified set of analysis rules is additionally modified using an analyzing module.

In response to determining that a given domain name is a malicious domain name, according to the non-limiting embodiments of the method may further include generating, using a processing module 1.4, a warning message, blocking network traffic from infected devices and/or creating an analytical report for the malicious domain name.

The operations in block 2.5 of the method include the analysis, using the processing module 1.4, of the obtained set of features of suspiciousness of the analyzed domain name using at least one previously trained machine learning algorithm.

In one embodiment, the implementation of the present technology according to the non-limiting embodiments of the method in the analyzing module 1.3 can additionally include: receiving, using the communication module 1.1, a plurality of domain names from at least one source of domain names, such as a remote device, server, host, domain, database, anti-virus system or program, website, etc.

According to another aspect of the present technology, a computer-readable medium for long-term storage of data is provided, the medium for storing computer-readable instructions that, when executed by a processor by a computing device, cause the steps of the method described in this document to be performed. Machine-readable instructions may comprise a machine-readable program code that can be transmitted using any suitable medium, including wireless means, wired facilities, fiber optic cable, radio frequency, and/or the like, and/or any the right combination. A computer-readable program code can be written in one of the programming languages or any combination of programming languages containing an object-oriented programming language, such as "Java", "Smalltalk", "C++", and/or the like, and conventional procedural programming languages such as the programming language "C". The computer-readable program code can be fully or partially executed on the computing device 1.

Thus, machine-readable software instructions stored on a machine-readable medium can control the computing device 1 in such a way that it will function as described above, so that computer-readable instructions stored in a computer-readable medium create an industrial product containing software instructions that implement the functions/the actions indicated in the blocks of the flowchart of FIG. 2, illustrating the operation of the computing device 1.

As a machine-readable media for long-term storage of data can be used one of the following material machine-readable media designed to store data for a long period of time: hard disk drives, read-only memory (ROM), compact disk drives (CD), drives on digital versatile disks (DVDs), floppy drives, Blu-ray drives, etc.

The invention claimed is:

1. A computing device for detecting malicious domain names in network traffic, the computing device comprising:
   a communication module configured to receive the network traffic from a data network,
   a filtering module, configured to connect to the communication module to receive the network traffic and to execute:
      extracting a plurality of data packets from the network traffic, and
      analyzing the plurality of data packets in order to extract at least one domain name from the plurality of data packets,
   an analyzing module, configured to connect to the filtering module to receive the at least one domain name therefrom and analyze each of the at least one domain name using a given set of analysis methods in order to generate, for a given one of the at least one domain names, a respective numerical value representative of a suspiciousness of the given one of the at least one domain name, generating the respective numerical value being based on a given set of features of suspiciousness corresponding to a respective one of the given set of analysis methods including, at least, a respective entropy value associated with the given one of the at least one domain name, determining the respective entropy value comprising:
      determining, based on a predetermined number of consecutively following symbols within the given one of the at least one domain name, a plurality of N-grams;
      determining a respective frequency of occurrence of each one of the plurality of N-grams within the given one of the at least one domain name; and
   a processing module, configured to connect to the analyzing module to receive the given set of features of suspiciousness and the respective numerical value for the given one of the at least one domain name, the processing module being further configured to:
      analyze the given set of features and the respective numerical value associated with the given one of the at least one domain name to determine whether the given one of the at least one domain name is malicious;
      classify the given one of the at least one domain name as being a malicious domain name, in response to analyzing the given set of features and the respective numerical value rendering a result indicative of the given one of the at least one domain name being malicious.

2. The computing device of claim 1, wherein, when analyzing the at least one domain name, the analyzing module is further configured to execute:
   receiving data from a language dictionary,
   extracting at least one word from the given one of the at least one domain name,
   determining a match between each word of the given one of the at least one domain name with at least one of words in the language dictionary, the match being indicative of a meaningfulness of the given one of the at least one domain name, and
   updating the respective numerical value based on the meaningfulness of the given one of the at least one domain name.

3. The computing device of claim 2, wherein, when analyzing the at least one domain names, the analyzing module is further configured to execute:
   determining a respective Levenshtein distance between each word of the given one of the at least one domain name and the corresponding one of the words in the language dictionary,
   comparing a given Levenshtein distance with a predetermined threshold value, the given Levenshtein distance being indicative of a correctness of spelling of the given one of the at least one domain name;
   updating the respective numerical value based on the correctness of spelling of the analyzed the given one of the at least one domain name, the correctness of spelling being determined based on the comparing.

4. The computing device of claim 3, wherein, to analyze the given one of the at least one domain name, the processing module is configured to execute at least one machine-learning algorithm, having been pre-trained to determine if a given domain name is malicious based at least on associated numerical value determined using the given set of analysis methods.

5. The computing device of claim 1, wherein the filtering module is further configured to determine if there is an analytical report for each of the at least one domain name.

6. The computing device of claim 5, wherein, in response to a presence of the analytical report, the filtering module is further configured to execute:
   receiving the analytical report,
   determine a match of each of the at least one domain name with the analytical report using a character-by-character comparison of each of the at least one domain name with domain names that identify the analytical report.

7. The computing device of claim 5, wherein, in response to an absence of the analytical report for the given one of the at least one domain name, the filtering module is further configured to transfer the given one of the least one domain name to the analyzing module.

8. The computing device of claim 1, wherein, when analyzing the given one of the at least one domain name, the analyzing module is further configured to execute:
   determining a number of characters in the given one of the at least one domain name,
   comparing a certain number of characters of the given one of the at least one domain name to a given threshold value of a length of the domain name, and
   generating the respective numerical value indicative of the suspiciousness of the given one of the at least one domain name, based on the comparison of the length of the given one of the at least one domain name and the given threshold value.

9. The computing device of claim 8, wherein, when analyzing the given one of the at least one domain name, the analyzing module is further configured to execute:
- receiving a set of known domain names,
- determining a match between the given one of the at least one domain name with at least one of the set of known domain names using a character-by-character comparison, the match being indicative of a popularity of the given one of the at least one domain name; and
- updating the respective numerical value based on the popularity of the given one of the at least one domain name.

10. The computing device of claim 1, wherein the communication module is further configured to connect to at least one of network traffic capture device connected to the data network.

11. The computing device of claim 1, wherein the analyzing module is further configured to update the given set of analysis methods.

12. The computing device of claim 1, wherein, in response to determining the given one of the at least one domain name as being the malicious domain name, the processing module is further configured to execute at least one of: generating a warning message, blocking network traffic from infected devices, generating an analytical report for the malicious domain name.

13. The computing device of claim 1, wherein the analyzing module is further configured to receive, via the communication module, at least one domain name from at least one source of domain names.

14. A computing device for analyzing domain names, the computing device comprising:
- a communication module, configured to receive at least one domain name from at least one source of domain names,
- an analyzing module, configured to connect to the communication module to receive the at least one domain name to analyze each of the at least one domain name using a given set of analysis methods in order to generate, for a given one of the at least one domain name, a respective numerical value representative of a suspiciousness of the given one of the at least one domain name, generating the respective numerical value being based on a given set of features of suspiciousness corresponding to a respective one of the given set of analysis methods including, at least, a respective entropy value associated with the given one of the at least one domain name, determining the respective entropy value comprising:
  - determining, based on a predetermined number of consecutively following symbols within the given one of the at least one domain name, a plurality of N-grams;
  - determining a respective frequency of occurrence of each one of the plurality of N-grams within the given one of the at least one domain name; and
- a processing module, configured to connect to the analyzing module to receive the given set of features of suspiciousness and the respective numerical value for the given one of the at least one domain name, the processing module being further configured to:
  - analyze the given set of features and the respective numerical value associated with the given one of the at least one domain name to determine whether the given one of the at least one domain name is malicious;
  - classify the given one of the at least one domain name as being a malicious domain name, in response to analyzing the given set of features and the respective numerical value rendering a result indicative of the given one of the at least one domain name being malicious.

15. A method for detecting malicious domain names in network traffic executable by a computing device communicatively coupled to a data network, the method comprising:
- receiving, by the computing device, the network traffic from the data network,
- extracting, by the computing device, a plurality of data packets from the network traffic,
- analyzing, by the computing device, the plurality of data packets in order to extract at least one domain name from the plurality of data packets,
- generating, by the computing device, for a given one of the at least one domain names, a respective numerical value representative of a suspiciousness of the given one of the at least one domain name, the generating the respective numeric value being based on a given set of features of domain name suspiciousness corresponding to a respective one of the given set of analysis methods including, at least, a respective entropy value associated with the given one of the at least one domain name, determining the respective entropy value comprising:
  - determining, by the computing device, based on a predetermined number of consecutively following symbols within the given one of the at least one domain name, a plurality of N-grams;
  - determining, by the computing device, a respective frequency of occurrence of each one of the plurality of N-grams within the given one of the at least one domain name;
- analyzing, by the computing device, the given set of features and the respective numerical value associated with the given one of the at least one domain name to determine whether the given one of the at least one domain name is malicious; and
- classifying, by the computing device, the given one of the at least one domain name as being a malicious domain name, in response to the analyzing rendering a result indicative of the given one of the at least one domain name being malicious.

16. The method of claim 15, wherein the receiving the network traffic further comprises connecting, via the data, to at least one of network traffic capture devices that are part of the data network.

17. The method of claim 15, further comprising determining whether there is an analytical report for each of the at least one domain name.

18. The method of claim 15, wherein the classifying is executed using a pre-trained machine learning algorithm.

19. The method of claim 15, wherein the generating the respective numerical value comprises iteratively updating the respective numerical value based on an outcome of at least some of the given set of analysis methods.

* * * * *

UNITED STATES PATENT AND TRADEMARK OFFICE
CERTIFICATE OF CORRECTION

| | |
|---|---|
| PATENT NO. | : 11,503,044 B2 |
| APPLICATION NO. | : 16/247870 |
| DATED | : November 15, 2022 |
| INVENTOR(S) | : Nikita Igorevich Kislitsin |

It is certified that error appears in the above-identified patent and that said Letters Patent is hereby corrected as shown below:

In the Claims

Column 26, Claim 3, Line 27 should read --correctness of spelling of the the given one of--

Column 28, Claim 16, Line 50 should read --network traffic further comprises connecting, via the data network, to--

Signed and Sealed this
Twenty-fourth Day of January, 2023

Katherine Kelly Vidal
*Director of the United States Patent and Trademark Office*